W. M. PARKISON.
TRANSMISSION GEARING.
APPLICATION FILED DEC. 2, 1907.
957,795.
Patented May 10, 1910.
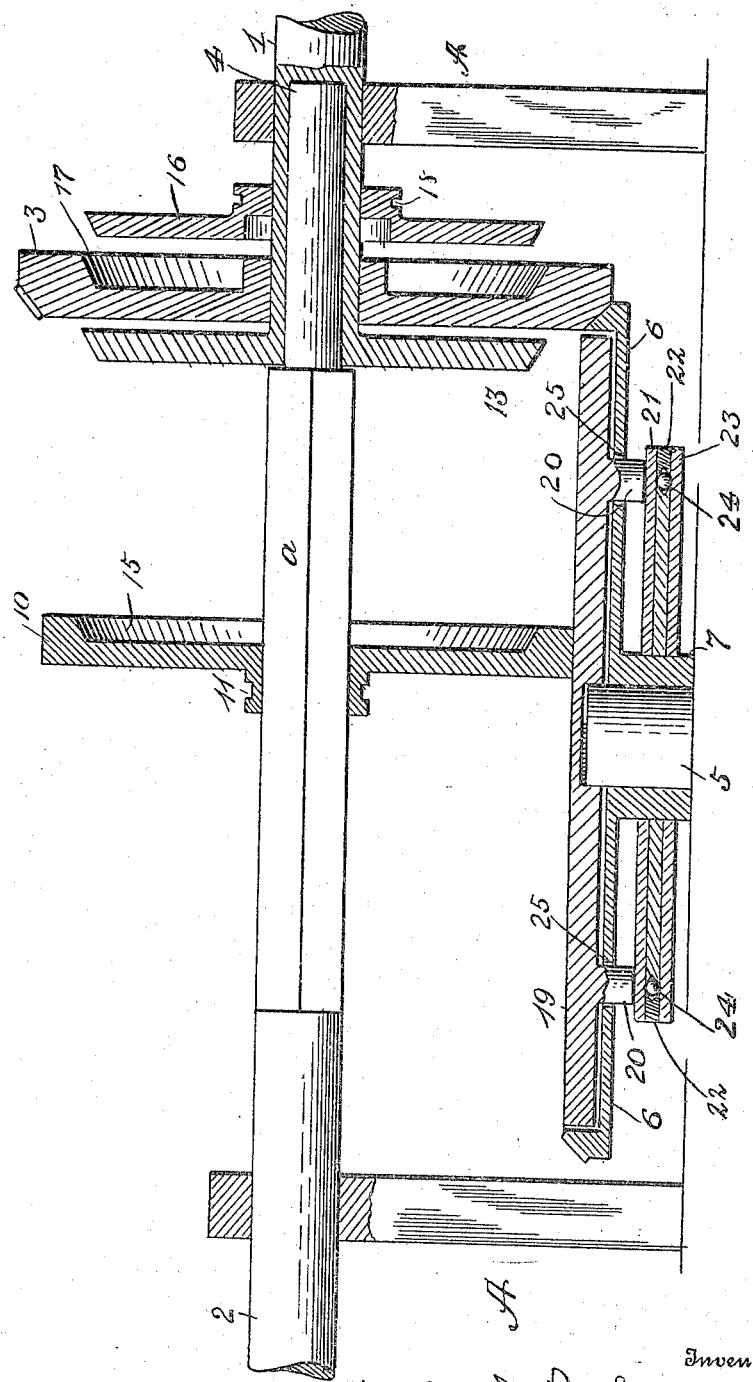

UNITED STATES PATENT OFFICE.

WALLACE M. PARKISON, OF RENSSELAER, INDIANA.

TRANSMISSION-GEARING.

957,795. Specification of Letters Patent. Patented May 10, 1910.

Application filed December 2, 1907. Serial No. 404,730.

*To all whom it may concern:*

Be it known that I, WALLACE M. PARKISON, a citizen of the United States, residing at Rensselaer, in the county of Jasper and State of Indiana, have invented certain new and useful Improvements in Transmission-Gearing, of which the following is a specification.

My invention relates to an improvement in transmission gearing for automobiles or other vehicles, and the object is to provide a simplified mechanism in which the friction is reduced to a minimum, and changes of speed may be wrought without difficulty or loss of time.

With these objects in view, my present invention consists in a drive, and driven shaft, loosely mounted beveled gear wheels, friction wheel slidable upon the driven shaft, and two sets of clutch mechanisms whereby to transmit motion to the driven shaft, either at a speed corresponding with that of the drive shaft, or with varying speed to suit the requirements.

My invention further consists in certain novel features of construction and combinations of parts which will be hereinafter described and pointed out in the claim.

The accompanying drawing is a vertical longitudinal sectional view of my improved transmission gear.

A, A represent two uprights or supports. 1 is a drive shaft journaled in one of these supports counter-bored, as at 4, at one end and provided with section 13 of a clutch mechanism at its inner end. The numeral 2 indicates the driven shaft journaled in the other standard A, and having one end journaled in the counter-bore 4 of drive shaft 1 with the intermediate portion *a* angular, and on this angular portion is mounted to slide the friction wheel 10, the hub of which has a collar 11 adapted to receive a spanner (not shown) for shifting it along lengthwise of the shaft, and one face is dished out as at 15 to form one section of the friction clutch of which 13 is the other section, so that when the two are together the same speed is transmitted to the driven shaft as to the drive shaft.

Mounted on the stub 5 is a beveled gear wheel 6, the upper face of which is recessed, and the friction disk 19 movably supported therein, it being counter-bored at its center to receive the end of the stub 5. This friction disk is provided with several small studs 20, 20 of which there may be three or more, which extend loosely through orifices 25, 25 to the gear wheel 6, and their free ends are adapted to be supported on plate 21 of a ball thrust bearing, which latter may be of any approved construction or of any well-known or suitable type of device for supporting friction wheels. Of this ball thrust bearing the numeral 22 indicates a ball retainer, and 23 is a bottom plate of the ball bearing, the balls 24, 24 affording antifriction support for the plates 21. These three members 21, 22, and 23 are mounted on the hub 7 of the beveled gear wheel 6.

Loosely mounted on the drive shaft 1 is the beveled pinion 3, and this has one face 17 dished out to constitute a clutch section of which 16 is the other section, the latter being keyed to slide upon the drive shaft 1 and provided with a collar 18 whereby shifted in or out of engagement with the pinion 3. Thus the pinion 3 and the beveled gear wheel 6 are always in mesh, and friction disk 19 is in engagement with the periphery of friction wheel 10 when the thrust bearing is raised by any approved mechanism to hold them in engagement with each other. Thus the friction disk 19 may be raised or lowered in or out of engagement with the friction wheel simply by raising or lowering the ball thrust bearing.

When in low speed clutch 16, which is keyed to slide upon drive shaft 1 permitting it to be shifted from one position to another, is made to engage the recess 17 in wheel 3 causing the latter to revolve with shaft 1, whereupon pinion 3 transmits motion to bevel gear wheel 6, which latter causes the friction disk 19 to revolve by reason of the studs 20, 20 extending through orifices 25, 25 in the beveled gear wheel 6. Then by raising the ball thrust bearing friction disk 19 is raised until it is pressed up against wheel 10 with sufficient force to cause wheel 10 to revolve. This wheel 10 in turn causes driven shaft 2 to revolve at greater or less speed according to its position with respect to the center of the friction disk 19, namely; at a slow speed when near the center of the latter and corresponding speed as the friction wheel is moved to the right and when engaged with section 13 of the clutch on the end of drive shaft 1, moving at corresponding speed with the latter. To reverse the motion the friction wheel 10 is shifted to the other side of the center of friction disk 19.

When wheel 10 engages clutch section 13 the friction disk 19 is lowered and clutch sections 16 and 17 are disengaged from each other causing wheels 3 and 6 and disk 19 to become idle, giving high speed or direct current.

Thus a simple mechanism is provided for the accomplishment of the purposes sought, and it is evident that slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent is:—

In a transmission gearing, the combination with a drive and a driven shaft, a clutch mechanism whereby motion can be transmitted indirectly to the driven shaft, a bevel gear wheel having a recess formed therein and in engagement with one member of the clutch mechanism, a friction disk carried by the bevel gear, a thrust bearing in engagement with the friction disk, a friction wheel adapted to be moved over the driven shaft and in position to be engaged by the friction disk, and a member on the drive shaft to engage the friction wheel whereby the driven shaft is driven at a speed equal to the speed of the drive shaft.

In testimony whereof I affix my signature in presence of two witnesses.

WALLACE M. PARKISON.

Witnesses:
B. F. FERGUSON,
W. H. PAESTINSON.